United States Patent [19]

Ulrich

[11] Patent Number: 4,812,808

[45] Date of Patent: * Mar. 14, 1989

[54] ELECTRONIC CONTROL MEANS AND IMPROVED METHOD FOR CONTROLLING LIGHTS

[76] Inventor: Larry F. Ulrich, Box 289, Garden City, Kans. 67846

[*] Notice: The portion of the term of this patent subsequent to Jun. 2, 2004 has been disclaimed.

[21] Appl. No.: 37,338

[22] Filed: Apr. 13, 1987

Related U.S. Application Data

[63] Continuation-in-part of Ser. No. 731,987, May 8, 1985, Pat. No. 4,670,736.

[51] Int. Cl.$^4$ .............................................. B60Q 1/46
[52] U.S. Cl. ................................... 340/468; 340/471; 340/475; 340/479; 307/10.8
[58] Field of Search ................ 340/81 F, 81 R, 73, 74, 340/67, 133; 307/10 LS

[56] References Cited

U.S. PATENT DOCUMENTS

| | | | |
|---|---|---|---|
| 4,006,453 | 2/1977 | Bryant | 340/67 |
| 4,037,195 | 7/1977 | Wojslawowicz | 340/81 F |
| 4,064,413 | 12/1977 | Andersen | 340/67 |
| 4,087,784 | 5/1978 | West | 340/81 F |
| 4,302,748 | 11/1981 | Gant | 340/81 F |
| 4,670,736 | 6/1987 | Ulrich | 340/81 R |

Primary Examiner—Donnie L. Crosland
Attorney, Agent, or Firm—John W. Carpenter

[57] ABSTRACT

An electronic control circuit in a control system for lights including a storage battery having two terminals with one terminal being connected to ground and another terminal connected to a flasher means. The control system further includes a left and right rear tail light, a left and right front running light, a right rear and left rear brake light, a left and right turn indicator light, a left and right turn switch, an emergency switch, and a brake light switch. The electronic control circuit includes in combination, an operating circuitry board; and an emergency circuitry mounted on the operating circuitry board. A right turn and left turn circuitry is mounted on the operating circuitry board. A brake light circuitry is also mounted on the operating circuitry board as well as a tail light circuitry.

20 Claims, 4 Drawing Sheets

ELECTRONIC CONTROL MEANS AND IMPROVED METHOD FOR CONTROLLING LIGHTS

CROSS REFERENCE TO RELATED APPLICATIONS

This is a continuation-in-part application of my co-pending application having Ser. No. 731,987, filed May 8, 1985 now U.S. Pat. No. 4,670,736.

BACKGROUND OF THE INVENTION

1. Field of the Invention

This invention is related to an improved method and electronic control circuit for controlling lights.

2. Description of the Prior Art

U.S. Pat. No. 3,909,661 to Grossenbacher discloses an electronic control for automobile lights. U.S. Pat. No. 3,621,329 by Frey teaches a combined system wherein the lights are multifunctional for both parking, boundary and tail lights which may be energized when the system is in operation. U.S. Pat. No. 4,223,375 by Alpen discloses a headlight system for motorcycles. None of the foregoing prior art patents teach or suggest the particular improved electronic control circuit of this invention.

SUMMARY OF THE INVENTION

This invention broadly accomplishes its desired objects by broadly providing an electronic control circuit in a control system for lights having a storage battery means with two terminals, one terminal being connected to ground and another terminal connected directly to a flasher means. The control system further includes a left and right rear tail light, a left and right front running light, a right rear and left rear brake light, and a left and right turn signal and indicator light. The control system additionally has a left turn switch means connected between the storage battery means and the left turn signal and indicator light, and a right turn switch means attached between the storage battery means and the right turn signal and indicator light. An emergency switch means is connected between the left rear brake light and tail light and right rear brake light and tail light. A brake light switch means is connected between the storage battery means and the left and right rear brake lights. The electronic control circuit comprises in combination, an operating circuitry board; and an emergency circuitry means mounted on the operating circuitry board and in electrical communication with the battery means and the emergency switch means. The emergency switch means when activated causes the emergency circuitry means to send intermittent electrical power from the battery means to the left rear brake lights and tail lights and right rear brake lights and tail lights causing the same to flash on and off intermittently. A right turn circuitry means is mounted on the operating circuitry board and is in electrical communication with the battery means and the right turn switch means. The right turn switch means when activated causes the right turn circuitry means to send intermittent electrical power from the battery means to the right turn signal and indicator light. A left turn circuitry means is mounted on the operating circuitry board and is in electrical communication with the battery means and the left turn switch means. The left turn switch means when activated causes the left turn circuitry means to send intermittent electrical power from the battery means to the left signal and turn indicator light. A brake like circuitry means is mounted on the operating circuitry board and is in electrical communication with the battery means and the brake light switch means. The brake light switch means when engaged causes the brake circuitry means to send electrical power from the battery means to the left and right rear brake lights. The electronic control circuit further comprises a tail light circuitry means mounted on the operating circuitry board and in electrical communication with the battery means. The tail light circuitry means sends electrical power from the battery means to the left and right rear tail lights, to the left and right front running lights, and to the left and right rear brake lights. It is therefore an object of this invention to provide an improved electronic control circuit.

Still further objects of the invention reside in a provision for an improved electronic control circuit that eliminates many of the wires and lights on a motorcycle, or the like.

These together with the various ancillary objects and features will become apparent as the following description proceeds, are attained by this invention, preferred embodiments being shown in the accompanying drawings, by way of example only, wherein:

DETAILED DESCRIPTION OF THE INVENTION

Figure 2:
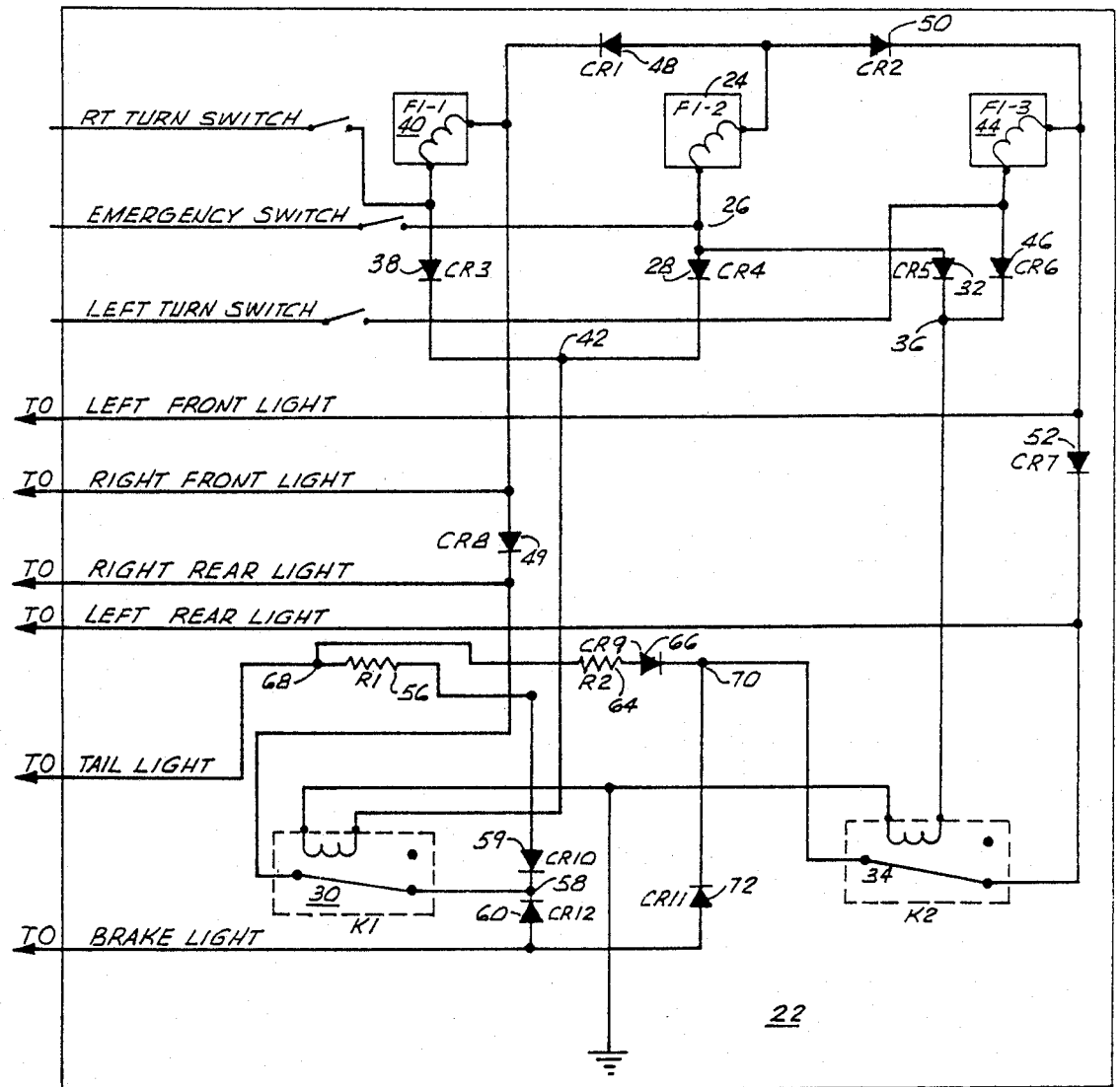
FIG. 2 is one preferred embodiment of the electronic circuitry diagram and components for this invention.
Figure 3:
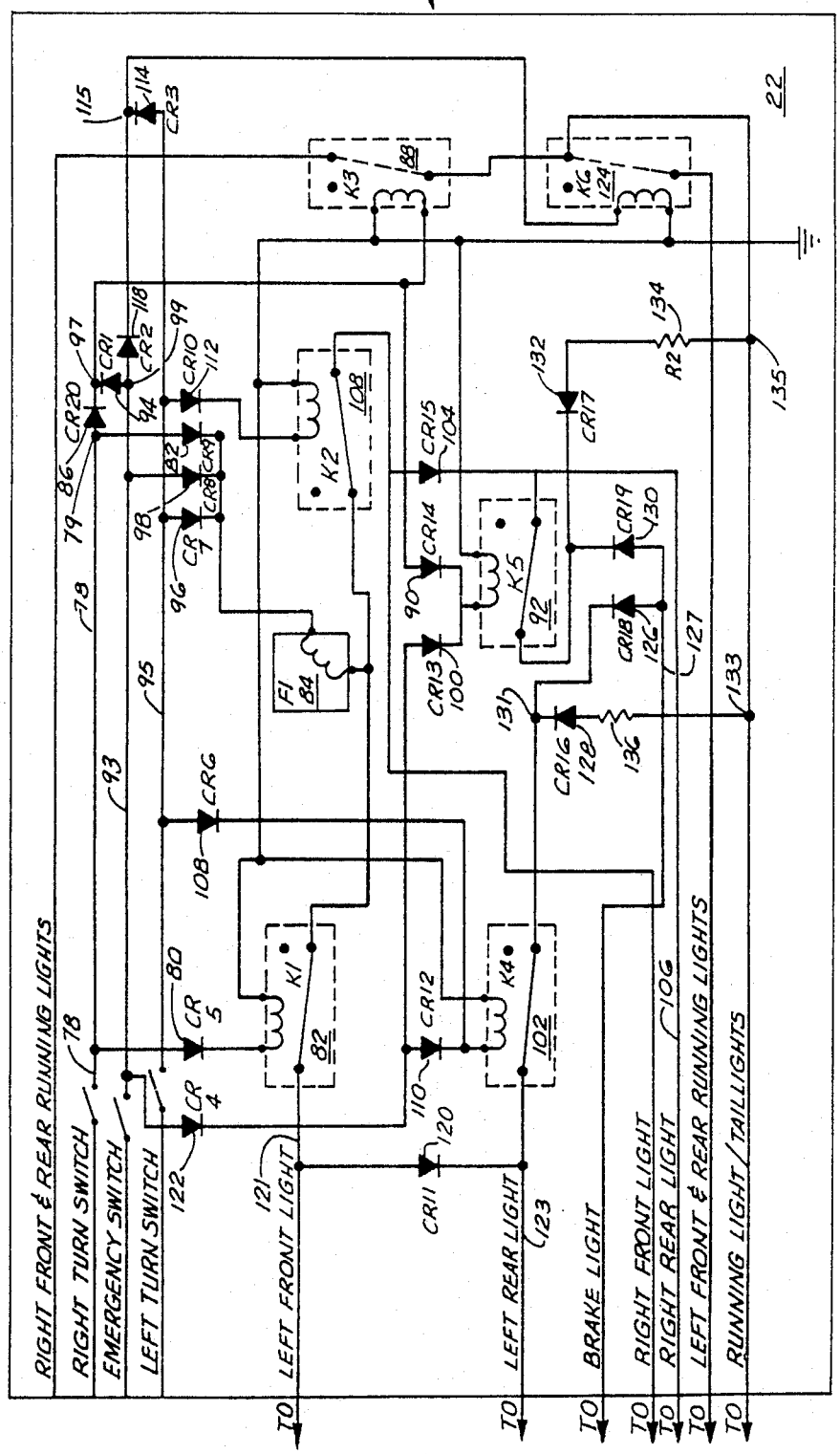
FIG. 3 is another preferred embodiment of the electronic circuitry diagram and components for this invention.

Referring in detail now to the drawings wherein similar parts of the invention are identified by like reference numerals, there is seen my electronic control system, generally illustrated as 8, which has two preferred embodiments respectively illustrated in FIGS. 2 and 3.

It should be initially understood that my electronic control system 8 may be utilized in any lighting system where it is desirable to eliminate many of the wires and lights without loosing any of the preexisting advantages and functionalities. Preferably, my electronic control system 8 is utilized in a preexisting motorcycle electronic control system for motorcycle lights. My system 8 ties into an existing motorcycle factory electronic control box, generally illustrated as 9 in FIG. 1, and controls and/or regulates on a motorcycle a left rear light 10, a right rear light 12, a left front light 14, and a right front light 16. In the preferred embodiment of FIG. 3, my electronic control system 8 also controls a plurality of motorcycle running lights which are not shown in the drawings because the number and position of the motorcycle running lights vary with the brand of motorcycle. In both preferred embodiments of my electronic control system 8, the left rear light 10 and the right rear light 12 function as brake lights, tail lights, left and right turn lights, and emergency lights. Any existing brake lights, tail lights turn lights and emergency lights may be eliminated on a motorcycle, along with the numerous wires associated therewith, and replaced with the left rear light 10 and the right rear light 12 and a single set of wires for same.

An existing motorcycle electronic control system would include an ignition switch 18, a storage battery 20 having tow terminals with one of the two terminals grounded, a left and right turn switch, an emergency or hazardous switch, brake switch which is activated when the brakes are engaged, and a tail light switch which may also activate a head light and running lights. None of the switches are shown in the drawings as they are well known to artisans in the art.

Figure 1:
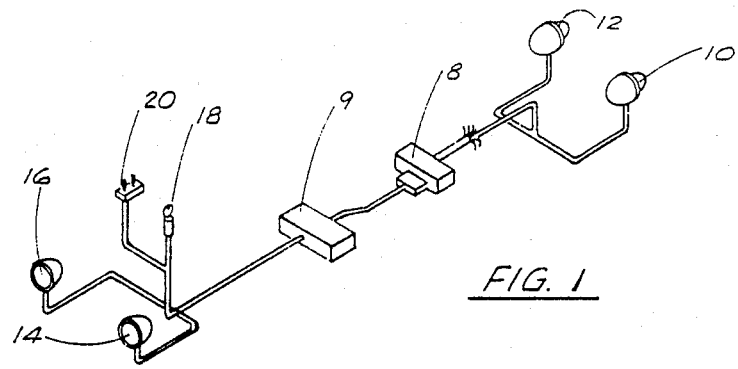
FIG. 1 is a perspective view of a pair of front lights and a pair of rear lights for a motorcycle with the electronic control system of this invention disposed between the existing factory electronic control box and the pair of rear tail lights.

When my electronic control system 8 is electrically engaged with the electronic control box 9 and between the left rear light 10 and right rear light 12 as illustrated in FIG. 1, the left turn switch is electrically connected between the storage battery 20 and the left rear 10 and the left front 14 lights, and the right turn switch is electrically attached between the storage battery 20 and the right rear 12 and right front 16 lights. The emergency switch is electrically connected between the storage battery 20 and the left front 14 and right front 16 lights and the left rear 10 and right rear 12 lights. The brake light switch and the tail light switch are each electrically engaged between the storage battery 20 and the left rear light 10 and the right rear light 12. In the embodiment of FIG. 3 where running lights exist, the running light switch (or the tail/running light switch where the tail light switch functions to activate both the tail lights and the running lights) is electrically connected between the storage battery 20 and the running lights.

The preferred embodiment of my electronic control system 8 in FIG. 2 comprises an operating circuitry board 22. An emergency circuitry means is mounted on the operating circuitry board 22 and is in electrical communication with the battery 20 and the emergency switch means. When the emergency switch means is activated, it causes the emergency circuitry means to send intermittent electrical power from the battery 20 to the left 14, 10 and right 16, 12 front and rear lights, respectively, causing the same to flash on and off intermittently. A right turn circuitry means is mounted on the operating circuitry board 22 and is in electrical communication with the battery 20 and the right turn switch means. When the right turn switch means is activated, it causes the right turn circuitry means to send intermittent electrical power from the battery 20 to the right front 16 and right rear 12 lights. A left turn circuitry means is also mounted on the operating circuitry board 22 and is in electrical communication with the battery 20 and the left turn switch means. The left turn switch means when activated causes the left turn circuitry means to send intermittent electrical power from the battery 20 to said left front 14 and left rear 10 lights. A brake circuitry means is mounted on the operating circuitry board 22 and is in electrical communication with said battery 20 and the brake light switch means. The brake light switch means when engaged causes the brake circuitry means to send electrical power from the battery 20 to said left 10 and right 12 rear lights. The final circuitry of my invention in FIG. 2 is a tail light circuitry means. It is mounted on the operating circuitry board 22 and is in electrical communication with the battery 20 and the tail light switch means. When the tail light switch means is closed it causes the tail light circuitry means to send electrical power from the battery 20 to the left 10 and right 12 rear lights.

The electronic control circuitry means in FIG. 2 comprises a turn flasher 24 electrically connected to the emergency switch means at 26. A rectifier 28 is electrically engaged to the flasher 24, and a relay 30 electrically communicates with the rectifier 28 and the flasher 24. Rectifier 32 is electrically connected to the flasher 24, and another relay 34 is electrically attached to the rectifier 32 at 36. Rectifier 38 is electrically connected to a turn flasher 40 and is also in electrical communication with rectifier 28 at the juncture 42. A third and final flasher 44 is in electrical engagement with rectifier 32 via juncture 36 and a rectifier 46 which is electrically connected to flasher 44. Rectifiers 48 and 40 are electrically engaged to flasher 24, and rectifier 50 and 52 electrically communicates with flasher 24 as illustrated in FIG. 2. Relay 30 is electrically engaged to rectifier 54 and resistor 56 at juncture 58 to electrically communicate with the same. Rectifier 60 electrically interconnects between juncture 58 and a juncture 62 of the brake light circuit as illustrated in FIG. 2. Resistor 64 and rectifier 66 are attached electrically in series between a juncture of a rectifier 72 with juncture 62, as illustrated in FIG. 2.

The emergency circuitry in FIG. 2 comprises flasher 24; rectifiers 28, 32, 38, 48, 49, 50 and 52; and relays 30 and 34. In operation of the emergency circuitry, power is fed to flasher 24 through rectifier 28 to relay 30. Relay 30 cancels brake light power and tail light power to the right rear light 12. Power is also fed to flasher 24 through 32 to relay 34. Relay 34 cancels brake light power and tail light power to the left rear light 10. Rectifiers 38 and 32 respectively block emergency power from flashers 40 and 44. Flasher 24 sends intermittent power through rectifier 48 to the right front light 16 and through rectifier 49 to the right front light 16 and through rectifier 49 to the right rear light 12 and intermittent power through rectifier 50 to the left front light 14 and through rectifier 52 to the left rear light 10. This causes lights 10, 12, 14 and 16 to flash on and off intermittently.

The right turn circuit in FIG. 2 comprises flasher 40; rectifiers 28, 38, 48 and 49; and relay 30. In operation of the right turn circuitry, power is fed to flasher 40 and through rectifiers 38 to relay 30. Relay 30 cancels brake light power and tail light power to the right rear light 12. Rectifier 28 blocks power from the left turn circuitry and the emergency circuitry. Flasher 40 sends intermittent power to the right front light 16 and through rectifier 49 to the right rear light 12. Rectifier 48 blocks intermittent power from flashers 24 and 44. Rectifier 49 blocks power of the right rear light 12 circuit from entering the right front light 16 circuit.

The left turn circuit in FIG. 2 comprises flasher 44; rectifiers 32, 46, 50 and 52; and relay 34. In operation of the left turn circuit, power is fed to flasher 44 and through rectifier 46 to relay 34. Relay 34 cancels brake light power and tail light power to the left rear light 10. Rectifier 32 blocks power from the right turn circuitry and the emergency circuitry. Flasher 44 sends intermittent power to the left front light 14 and through rectifier 52 to the left rear light 10. Rectifier 50 blocks intermittent power from flashers 24 and 40. Rectifier 52 blocks power of the left rear light 10 circuit from entering the left front light 14 circuit.

The tail light circuit in FIG. 2 comprises resistors 56 and 64; rectifiers 49, 54, 60, 52; 66 and 72; and relays 30 and 34. In operation of the tail light circuit power is fed to resistor 56 through rectifier 54 to relay 30 for tail light power to right rear light 12. Rectifier 49 blocks tail light power from the right front light 16 circuit. Rectifier 60 blocks tail light power from the brake light circuitry. Power is also fed to resistor 64 through rectifier 66 to relay 34 for tail light power to the left rear light 10. Rectifier 52 blocks tail light power from the left front light 14 circuit. Rectifier 72 blocks tail light power to the brake light circuit.

The brake light circuit in FIG. 2 comprises rectifiers 60, 49, 54, 72, 52 and 66; and relays 30 and 34. In operation of the brake light circuitry, power is fed through rectifier 60 through relay 30 to the right rear light 12. Rectifier 49 blocks brake light power from the right front light 16 circuitry, and rectifier 54 blocks brake light power from the right tail light circuit. Power is also fed through rectifier 72 through relay 34 to the left rear light 10. Rectifier 52 blocks brake light power from the left front light 14 circuitry, and rectifier 66 blocks brake light power from the left tail light circuit. The brake light power overrides the resistors 56 and 64 for the tail light circuit to render a brighter braking light.

With respect to the preferred embodiment of my invention in FIG. 2, it should be understood that the various components may be of any value which would accomplish the function and method for controlling lights as intended herein. Preferably, all of the rectifiers (28, 38, 48, 50, 32, 46,, 52, 49, 66, 54, 60, and 72) are each 50 volts, 3-300 amp surge rating (for ½ cycle) epoxy diodes; the resistors 56 and 64 are 5 watt, 1 ohm, wire wound resistors; the two relays 30 and 34 are 8 amp contact (12 volt coil, 70 ohms, 72 m A); and the three flashers 24, 40, and 44 are 12 volt heavy duty variable load-turn signal flashers.

The leads on FIG. 2 designated "RT Turn Switch", "Emergency Switch", "LT Turn Switch", "Tail Light" and "Brakelight" interconnect electrically via a harness (not shown in the drawings) to the existing motorcycle factory electronic control box 9 which would be readily known to artisans possessing ordinary skill. The harness would also have four electrical conductors interconnecting the leads on FIG. 2 designated "Left Front Light", "Right Front Light", "Right Rear Light" and "Left Rear Light" respectively to the left front light 14, the right front light 16, the right rear light 12 and the left rear light 10.

The rectifiers in FIG. 2 isolate the various circuits. Rectifiers 48 and 28 isolate the right turn from the emergency and the left turn circuit. Rectifiers 38 and 46 isolate the emergency circuit from flashers 40 and 44. Rectifiers 50 and 32 isolate the left turn from the right turn and emergency circuit. Rectifiers 52 and 49 respectively isolate the left front circuit from the left rear circuit and the right front circuit from the right rear circuit, respectively. Rectifiers 66 and 54 isolate from the tail light power circuit respectively the left turn and emergency circuit, and the right turn and emergency circuit, respectively. From the brake light power circuit, rectifiers 72 and 60 isolate respectively the left turn and emergency circuit, and the right turn and emergency circuit, respectively.

Resistor 56 controls the power supply for the right rear light 12, and resistor 64 controls the power supply for the left rear light 10.

Relay isolates the right tail light and brake light from the right turn-emergency circuit. Relay 34 isolates the left tail light and brake light from the left turn-emergency circuit.

As was previously mentioned, flasher 40 is for the right turn circuit, flasher 24 is for the emergency circuit, and flasher 44 is for the left turn circuit.

The control circuit 8 for the preferred embodiment of FIG. 2 enables four functions to operate into a single element light bulb to the rear of any vehicle (i.e. preferably a motorcycle); and enables two functions to operate into a single element light bulb to the front of any vehicle (i.e. preferably a motorcycle). It should be understood that a double element light bulb may be utilized in this embodiment of the invention.

The flashers 40, 24 and 44 are very difficult to mount on the circuit board 22. In order to solve this problem, I have devised an advance design for the embodiment of FIG. 2 wherein flashers 40 and 44 have been replaced by a pair of relays on the circuit board 22. This advance design embodiment is illustrated in FIG. 3 and also includes right, left front and rear running light circuitry along with a running light tail light circuitry, in addition to an emergency circuitry, a right turn circuitry, a left turn circuitry and a brake circuitry. In the embodiment of the invention of FIG. 3, there may be a separate left-right running light switch connected between the storage battery means and the left, right front and rear running lights in order to illuminate the same. The running light/tail lights include added running lights and have a tail/running light switch, which has been previously mentioned.

The preferred embodiment of my electronic control system 8 in FIG. 3 comprises the operating circuitry board 22. For the preferred embodiment of the invention in FIG. 3, an emergency circuitry means is mounted on the operating circuitry board 22 and is in electrical communication with the battery 20 and the emergency switch means. When the emergency switch means in FIG. 3 is activated, it causes the emergency circuitry means to send intermittent electrical power from the battery 20 to the left 14, 10 and right 16, 12 front and rear lights, respectively, causing the same to flash on and off intermittently. A right turn circuitry means is mounted on the operating circuitry board 22 and is in electrical communication with the battery 20 and the right turn switch means. When the right turn switch means of FIG. 3 is activated, it causes the right turn circuitry means to send intermittent electrical power from the battery 20 to the right front 16 and right rear 12 lights. A left turn circuitry means is also mounted on the operating circuitry board 22 and is in electrical communication with the battery 20 and the left turn switch means. The left turn switch means of FIG. 3 when activated causes the left turn circuitry means to send intermittent electrical power from the battery 20 to said left front 14 and left rear 10 lights. A brake circuitry means is mounted on the operating circuitry board 22 in FIG. 3 and is in electrical communication with said battery 20 and the brake light switch means. The brake light switch means in FIG. 3 when engaged causes the brake circuitry means to send electrical power from the battery 20 to said left 10 and right 12 rear lights. A right front and rear running light circuitry means and a left front and rear running light circuitry means are mounted on the operating circuitry board 22 of FIG. 3 and is in electrical communication with the battery 20 and a running light switch means. When the running light switch is closed it causes the right, left front and rear running lights circuitry means to send electrical power from the battery 20 to any right, left front and rear running lights that are on the motorcycle. The final circuitry of my invention in FIG. 3 running light/tail light circuitry means. It is mounted on the operating circuitry board 22 and is in electrical communication with the battery 20 and the tail light switch means. When the tail light switch means is closed it causes the running light/tail light circuitry means to send electrical power from the battery 20 to the left 10 and right 12 rear lights and any additional running lights that are on the motorcycle in addition to the right, left front and rear running lights.

The electronic control circuitry of FIG. 3 comprises a conductor 78 to the right turn switch means. A rectifier 80 is interconnected between conductor 78 and a relay 82. Rectifier interconnects from conductor 78 a juncture 79 to a flasher 84. Rectifier 86 is interconnected between juncture 79 to a relay 88. It should be understood that rectifier 86 has to be ahead of rectifier 82 with respect to conductor 78 in order to limit the voltage to rectifier 82. Rectifier 90 is in electrical communication to and between rectifier 86 and a relay 92. The electronic control circuitry of FIG. 3 additionally comprises an emergency switch conductor 93 and a left turn switch conductor 95. Rectifier 94 is interconnected between juncture 97 in conductor 78 and juncture 99 on conductor 93. Rectifier 96 connects between conductor 95 and the common conductor to rectifier 82, and rectifier 98 connects between the common conductor to rectifier 82 and the conductor 93. Rectifier 100 is electrically engaged to a relay 102. Rectifier 104 electrically engages to a right rear conductor 106 and is also in communication with a relay 108. A rectifier 110 electrically connects to relay 92 via rectifiers 100. Rectifier 112 is interconnected between conductor 95 and relay 108. Rectifier 114 is on conductor 95 and connects to conductor 93 at juncture 115. Rectifier 118 is interconnected on conductor 93 between juncture 99 and juncture 115. As was seen for rectifier 86 that has to be ahead of rectifier 82 with respect to conductor 78 in order to limit the voltage to rectifier 82, rectifier 94 has to be in between rectifier 86 and rectifier 118 as illustrated in FIG. 3. Rectifier 120 interconnects a left front light conductor 121 with a left rear light conductor 123. Rectifier 122 is electrically engaged between the emergency switch conductor 93 and relay 102 via conductor 110. Relay 124 is electrically engaged to rectifier 118. Rectifier 126 connects to a brake light conductor 127 at juncture 129 and is also electrically connected to the relay 102. Rectifier 128 is in series with resistor 136 and interconnects at juncture 131 the conductor electrically engaging rectifier 126 with the relay 102 with the running light/tail light conductor at juncture 133. Rectifier 130 attached electrically to relay 92 on the brake light circuitry, and rectifier 132 is connected in series with resistor 134 to the running light/tail light conductor at juncture 135.

The right turn circuitry in FIG. 3 comprises flasher 84; relays 82, 88, 92, and 108; and rectifiers 80, 82, 86, 90, 94, 96, 98, 100 and 104. In operation of the right turn circuitry, power is fed through rectifier 80 to relay 82 which cancels power to left circuit, and through rectifier 86 to relay 88 which cancels power to right and rear running lights. Power is also fed through rectifier 90 relay 92 that cancels power to brake and tail lights to rear. Rectifier 94 blocks right turn circuit from emergency circuit power, and rectifier; 96 blocks right turn circuit power. Rectifier 98 blocks right turn circuit from emergency circuit. Rectifier 100 blocks right turn circuit from relay 102 and the emergency circuit. Flasher 84 sends intermittent power through relay 108 to the right front light 16 and through rectifier 104 to the right rear light 12. Rectifier 104 blocks right rear circuit from right front circuit.

The left turn circuit in FIG. 3 comprises flasher 84, relays 102, 108, 124, and 82; and rectifiers 108, 110, 96, 112, 114, 118, 98, and 120. In operation of the left turn circuit, power is fed through rectifier 108 to relay 102 that cancels the brake and tail light power to the left rear. Rectifier 110 blocks the left circuit from the relay 92 and the emergency circuit. Power is also fed through rectifier 96 to flasher 84 and through rectifier 112 to relay 108 that cancels the right turn circuit. Power is also fed through rectifier 114 to relay 124 which cancels left front and rear running lights. Rectifier 118 blocks left turn circuit from the emergency circuit. Rectifier 98 blocks the left turn circuit from the emergency circuit, and rectifier 82 blocks the left turn circuit from the right turn circuit. Flasher 84 sends intermittent power through the relay 82 to the left front light 14, and through rectifier 120 to the left rear light 10. Rectifier 120 blocks the left rear circuit from the left front circuit.

The emergency circuit in FIG. 3 comprises flasher 84; relays 82, 108, 88, 102, 92 and 124; and rectifiers 122, 110, 100, 98, ;96, 82, 104, 118, 94, 86, 114, and 120. In operation of the emergency circuit in FIG. 3, power is fed through rectifier 122 and rectifier 110 to relay 102 which cancels brake and tail light power to the left rear. Power is also fed through rectifier 100 to relay 92 that cancels brake and tail lights to right rear. Power is finally fed through rectifier 98 to the flasher 84. Rectifier 96 blocks the emergency circuit from the left circuit. Rectifier 82 blocks the emergency circuit from the right turn circuit, and through rectifier 118 to relay 124 which cancels left front and rear running lights; and through rectifier 94 to relay 88 that cancels right front and rear running lights. Rectifier 86 blocks emergency circuit from the right turn circuit, and rectifier 114 blocks the emergency circuit from the left turn circuit. Flasher 84 send intermittent power through relay 82 to the left front light 14 circuit and through rectifier 120 to the left rear light 10 circuit, and through relay 108 to the right front light 16 circuit, and through rectifier 104 to the right 12.

The brake light circuitry in FIG. 3 comprises relays 102 and 92; and the rectifiers 126, 128, 120, 130, 132 and 104. In operation of the brake light circuitry in FIG. 3, power is fed through rectifier 126 and relay 102 to the left rear light 10. Rectifier 128 blocks the brake circuit from the running light/tail light circuit. Rectifier 120 blocks the brake circuit from entering the left front circuit. Power is also fed through rectifier 130 and relay 92 to the right rear light 12. Rectifier 132 blocks the brake circuit from the tail light circuit, and rectifier 104 blocks the brake circuit from entering the right front circuit.

The running light/tail light circuitry comprises resistors 136 and 134; and relays 102 and 92; rectifiers 128, 126, 120, 130, and 104. In operation of the running light/tail light circuit, power is fed through resistor 136 and rectifier 128 and through relay 102 to the left rear light 10. Rectifier 126 blocks the running light/tail light circuit from the brake circuit, the rectifier 120 blocks the running light/tail light circuit power from entering the left front circuit. Power is also fed through resistor 134, through rectifier 132, through relay 92 to the right rear light 12. Rectifier 130 blocks the running light/tail light circuit from the brake circuit, and rectifier 104 blocks the running light/tail light circuit from entering the right front circuit.

The right, left front and rear running light circuitry in FIG. 3 comprises relay 124 and 88. In operation of the left, right front and rear running light circuit, power is fed through relay 124 to the left front and rear running lights, and through relay 88 to the right front and rear running lights. Relay 88 and 124 are controlled by the left turn, right turn and emergency circuits.

With respect to the preferred embodiment of my invention in FIG. 3 it should be understood that the various components may be of any value which would accomodate the function and method for controlling lights as intended in this preferred embodiment. Preferably, each of the rectifiers in this are 50 volt, 3-300 amp. surge rating (for ¼ cycle) epoxy rectifier diodes. The resistors 134 and 136 are 5 watt, 1 ohm plus or minus 5%, wire wound resistors; the six relays are 8 amp contact (12 volt coil, 70 ohms, 72 mA), and the flasher 84 is 12 volt heavy duty variable load turn signal flasher.

The lights on FIG. 3 designated "Right Front and Rear Running Lights", "Right Turn Switch", "Emergency Switch", "Left Turn Switch", "Brake Light", "Left Front and Rear Running Lights", and "Running Light/Tail lights" are interconnected electrically via a harness (not shown in the drawings) to the existing motorcycle factory electronic control box 9 which, as was previously mentioned, would be readily known to artisans possessing ordinary skill. As was the case for the preferred embodiment of FIG. 2, the harness for the preferred embodiment of FIG. 3 would also have four electronic conductors interconnecting the leads on FIG. 3 designated "Left Front Light", "Left Rear Light", "Right Front Light", "Right Rear Light", respectively to the left front light 14, the left rear light 10, the right front light 16 and the right rear light 12.

As was the situation in FIG. 2, the rectifiers in FIG. 3 isolate the various circuits. Rectifiers 94 and 100 isolate the right turn circuit from the emergency circuit. Rectifiers 118, 114, 108 and 110 isolate the left turn circuit from the emergency circuit. Rectifiers 122, 80 and 112 are used as safety blocks. Rectifier 96 isolates the left turn circuit from the emergency and right turn circuits. Rectifier 98 isolates the emergency circuit and the left and right turn circuits. Rectifier 82 isolates the right turn circuit from the emergency and left turn circuits. Rectifier 120 isolates the left front and left rear circuits. Rectifiers 90 and 86 isolate the emergency circuit from the right turn circuits. Rectifier 104 isolate the right front circuit and the right rear circuits. Rectifiers 128 and 132 isolate all circuits from the running light power supply, whereas rectifiers 126 and 130 isolate all circuits from the brake light power supply. Rectifiers 118 and 114 allow the emergency circuit and the left turn circuit to control the left front and rear running light circuit, whereas rectifiers 94 and 86 allow the emergency circuit and the right turn circuit to control the right front and rear running light circuit.

Resistors 134 and 136 respectively control the power supply for the right rear light 12 and the left rear light 10 for the running light/tail light circuit, respectively.

The flasher 84 controls the emergency circuit, the right turn and the left turn circuits.

Relay 82 is controlled by the right turn circuit when in use, and isolates the right turn circuit from the left circuit when the right turn circuit is in use. Relay 108 is controlled by the left turn circuit when in use, and isolate the left turn circuit from the right turn circuit when the left turn circuit is in use. Relay 88 is controlled by the right turn circuit and the right turn circuit and the emergency circuits, and is used to cancel the right front and rear running lights when the right turn and emergency circuits are used. Relay 102 is controlled by the left turn circuit and the emergency circuit and cancels the brake light and running light/tail light when the left turn circuit and the emergency circuit is used. Relay 92 is controlled by the right turn circuit and the emergency circuit and cancels the brake light and the running light/tail light circuit when the right turn circuit and the emergency circuit are used. The left relay employed in this embodiment of the invention is relay 124 which is controlled by the left turn circuit and the emergency circuits, and is utilized to cancel the left front and running left front circuit and running light/tail light circuit when the right turn circuit and the emergency circuits are used.

The controlled circuit 8 for the preferred embodiment of FIG. 3 also enables four functions to operate into a single element light bulb to the rear of any vehicle (i.e. preferably a motorcycle), and enables two functions to operate into a single element light bulb tothe front of any vehicle (i.e. preferably a motorcycle). In this preferred embodiment of the invention, the controlled circuit 8 includes a controlled left, right front and rear running light circuit that is controlled by the right turn circuit, the left turn circuit, and the emergency circuit when in use. It should be understood for this embodiment of the invention that a double or dual element light bulb may be utilized.

Figure 4:
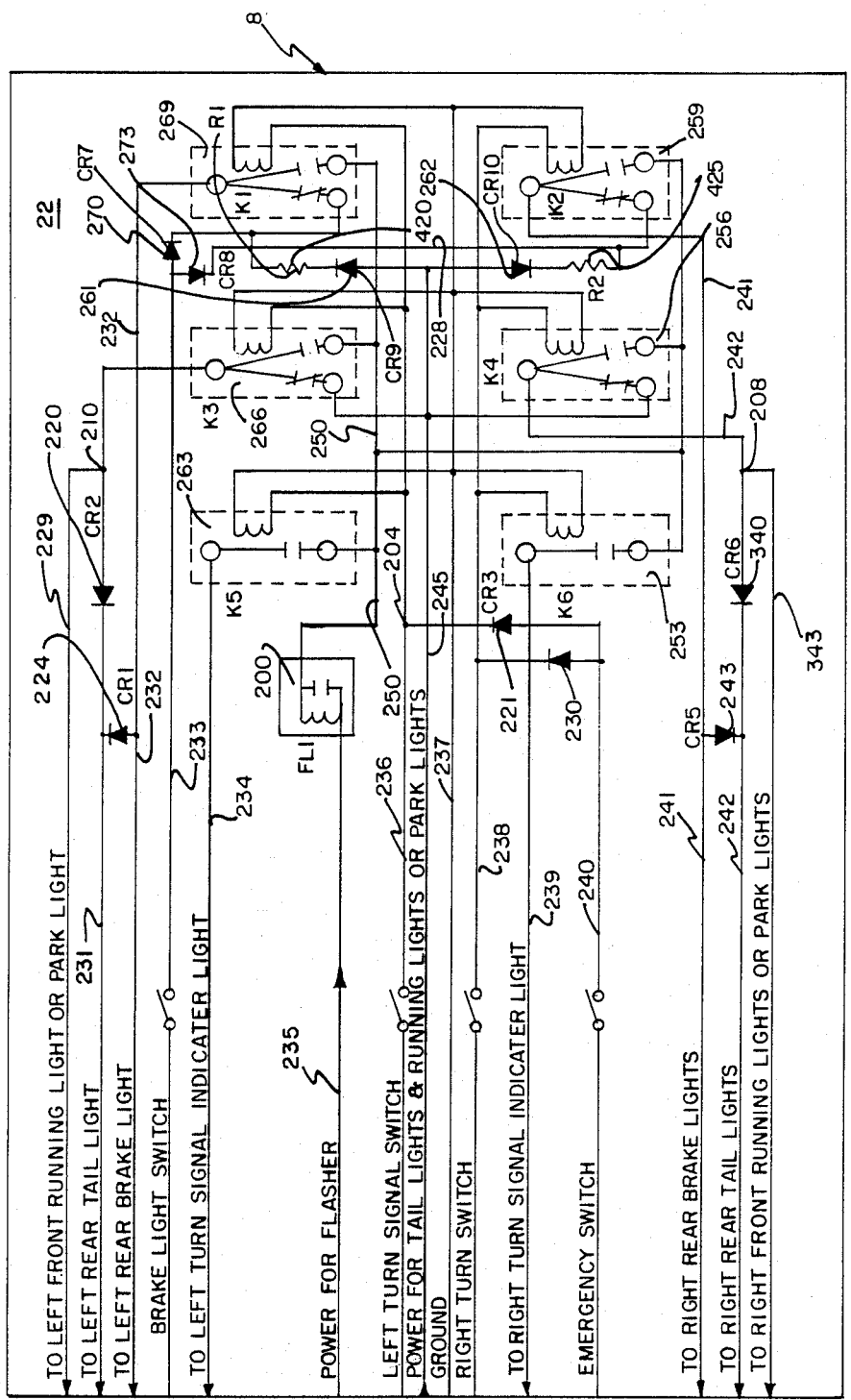
FIG. 4 is yet another preferred embodiment of the electronic circuitry diagram and components of this invention.
Figure 5:
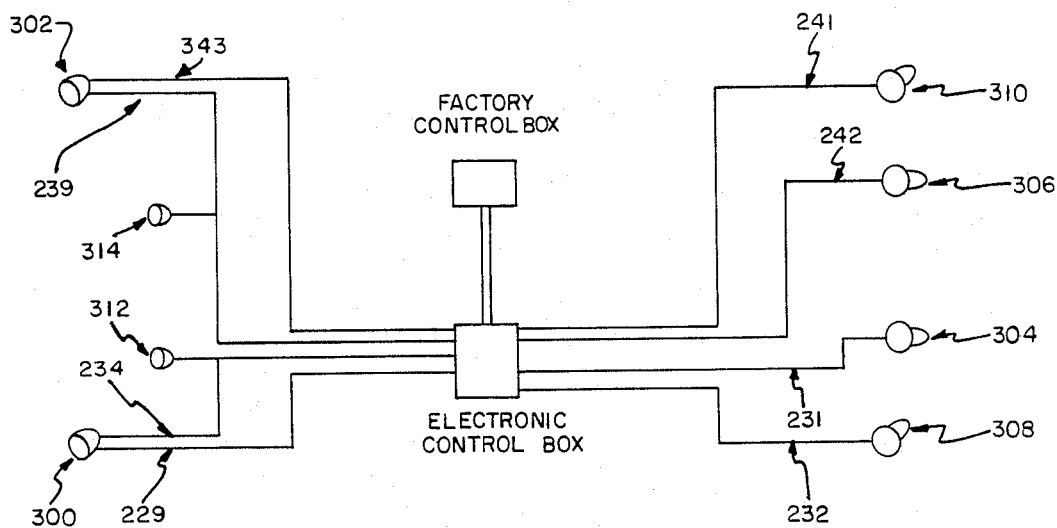
FIG. 5 is an electrical schematic diagram of the lights which are controlled by the electronic circuitry diagram of FIG. 4.

In another embodiment of the present invention that is illustrated in FIG. 4, the electronic control system 8 comprises the operating circuitry board 22 having mounted thereon a right turn circuitry, a left turn circuitry, a brake light circuitry, a tail light circuitry, and an emergency light circuitry, to control the lighting system of FIG. 5. The light system in FIG. 5 comprises a left front turn signal 300 and running light 300, a right front turn signal 302 and running light 302, a left rear tail light 304, a right rear tail light 306, a left rear brake light 308, a right rear brake light 310, a left turn indicator light 312, and a right turn indicator light 314.

The right turn circuitry in FIG. 4 comprises flasher 200, relays 253, 256, 259, and rectifiers 230, 340, 243. In operation of the right turn circuitry, power is fed through flasher 220 to relay 253, which interconnects conductor 250 to conductor 239 which leads to right turn signal and indicator. Power is also fed through flasher 220 to relay 256 which interconnects conductor 250 to conductor 242, and cancels tail light power to right rear tail lights 306, and sends intermittent power to right rear tail light 306. Power is further also fed through flasher 220 to relay 259 which interconnects conductor 250 to conductor 241, and cancels brake light power to right rear brake 310, and sends intermittent power to right rear brake lights 310. Conductor 242 interconnects to conductor 343 at junction 208. Rectifier 230 interconnects conductor 238 to conductor 240 and blocks power from conductor 238. Rectifier 340 also blocks brake light power from entering into tail light circuitry. Rectifier 243 interconnects conductor 241 to conductor 242, and blocks tail light power from entering conductor 241.

The left turn circuitry in FIG. 4 comprises flasher 200, relays 263, 266, 269, and rectifiers 221, 222 and 224. In operation of the left turn circuitry, power is fed through flasher 220 to relay 263, which interconnects conductor 250 to conductor 234 which leads to left turn signal light 300 and indicator 312. Power is also fed through flasher 220 to relay 266 which interconnects conductor 250 to conductor 231 and cancels tail light power to left rear tail lights 304 and sends intermittent power to left rear tail lights 304. Power is further also fed through flasher 220 to relay 269 which interconnects conductor 250 to conductor 232, and cancels brake light power to left rear brake lights 308, and sends intermittent power to left rear brake lights 308. Conductor 229 interconnects to conductor 231 at junction 210. Rectifier 221 interconnects conductor 236 to conductor 240, which blocks power from conductor 236. Rectifier 220 blocks brake light power from entering into tail light circuitry. Rectifier 224 interconnects conductor 232 to conductor 231, and blocks tail light power from entering conductor 232.

The brake light circuitry in FIG. 4 comprises rectifiers 270, 273, 261, 262, 245, 340, 222 and 224 relays 269 and 259. In operation of the brake light circuitry the power is fed through conductor 233 through rectifiers 270, 273 through relays 269, 259, through conductor 232, through rectifier 224 to conductor 231, and through conductor 241 through rectifier 243 to conductor 242. Rectifier 240 blocks brake light power from entering junction 208 to conductor 343 and from entering relay 256. Rectifier 220 blocks brake light power from entering junction 210 to conductor 229, and from entering relay 266. Rectifiers 261 and 262 block brake light power from entering into conductor 245.

The tail light circuitry in FIG. 4 comprises rectifiers 261, 262, 270, 273, 243, 340, 224, 222, relays 266, 256, 269, and resistors 420 and 425. In operation of the tail light circuitry the power is fed through conductor 245, through relay 266 to conductor 231 to junction 210 through conductor 229 and through rectifier 220, and through relay 256 to conductor 242 to junction 208 to conductor 343, and through rectifier 340, and through rectifier 261 to resistor 420 through relay 269 to conductor 232, and through rectifier 224 to conductor 231, and through rectifier 262 through resistor 425 through relay 259 to conductor 241 through rectifier 243 to conductor 242. As can be readily seen from FIG. 4 and the foregoing discussion, the tail light circuitry controls the operation of the left and right front running lights 300 and 302, left and right rear tail lights 304 and 306, and left and right rear brake lights 308 and 310. Rectifiers 270 and 273 block tail light power from entering conductor 233.

The emergency light circuitry in FIG. 4 comprises flasher 200, relays 263, 253, 266, 256, 269, 259 and rectifiers 230 and 221. In operation of the emergency circuitry, power is fed to relay 253, which interconnects conductor 250 to conductor 239 to right turn signal and indicator 314, and to relay 256 which interconnects conductor 250 to conductor 242, and cancels tail light power to right rear tail light 306, and sends intermittent power to right rear tail light 306. Power is also fed to relay 259 which interconnects conductor 250 to conductor 241, and cancels brake light power to right rear brake lights 310, and sends intermittent power to right rear brake lights 310. Rectifier 230 interconnects conductor 238 to conductor 240 and blocks power from conductor 238. Power is fed to relay 263, which interconnects conductor 250 to conductor 234 which leads to left turn signal and indicator 312, and to relay 266 which interconnects conductor 250 to conductor 231, and cancels tail light power to left rear tail lights 308 and sends intermittent power to left rear tail light 308, and to relay 269 which interconnects conductor 250 to conductor 232, and cancels brake light power to left rear brake lights 308, and sends intermittent power to left rear brake lights 308. Rectifier 221 interconnects conductor 236 to conductor 240, which blocks power from conductor 236.

With respect to the preferred embodiment of my invention in FIG. 4, it should be understood that the various components may be of any value which would accomplish the function and method for controlling lights as intended herein. Preferably, all of the rectifiers in FIG. 4 are each 50 volt, 3-300 amp surge rating (for ½ cycle) epoxy diodes; the resistors in FIG. 4 are all 5 volt, 1 ohm, wire wound resistors; the relays in FIG. 4 are all 8 amp contact (12 volt coil, 70 ohms, 72 mA); and the single flasher 200 is a 12 volt heavy duty variable load-turn signal flashers.

While the present invention has been described herein with reference to particular embodiments thereof, a latitude of modification, various changes, and substitutions are intended in the foregoing disclosure, and it will be appreciated that in some instances some features of the invention will be employed without a corresponding use of other features without departing from the scope of the invention as set forth.

I claim:

1. In a control system for lights including a storage battery means having two terminals, one terminal being connected to ground and another terminal connected to a flasher means, a left and right front signal lights and rear tail lights, a left and right front running lights, right rear and left rear brake lights, left and right turn signal and indicator lights, a left turn switch means connected between the storage battery means and the left turn signal and indicator lights, a right turn switch means attached between the storage battery means and the right turn signal and indicator lights, an emergency switch means connected between the storage battery means and the left-front signal light and left rear brake light and tail light and right front signal light and rear brake light and tail light, and a brake light switch means connected between the storage battery means and the left and right rear brake lights, an electronic control circuit comprising in combination, an operating circuitry board;
an emergency circuitry means mounted on said operating circuitry board and in electrical communication with said battery means and said emergency switch means, said emergency switch means when activated causes the emergency circuitry means to send intermittent electrical power from the battery means to the left front signal light and rear brake lights and tail lights and right front signal light and rear brake lights and tail lights causing the same to flash on and off intermittently;
a right turn circuitry means mounted on said operating circuitry board and in electrical communication with said battery means and said right turn switch means, said right turn switch means when activated causes the right turn circuitry means to send intermittent electrical power from the battery means to said right front signal light and turn indicator light;

a left turn circuitry means mounted on said operating circuitry board and in electrical communication with said battery means and said left turn switch means, said left turn switch means when activated causes the left turn circuitry means to send intermittent electrical power from the battery means to said left turn signal light and indicator light;

a brake light circuitry means mounted on said operating circuitry board and in electrical communication with said battery means and said brake light switch means, said brake light switch means when engaged causes the brake circuitry means to send electrical power from the battery means to said left and right rear brake lights;

a tail light circuitry means mounted on said operating circuitry board and in electrical communication with said battery means, said tail light circuitry means sends electrical power from the battery means to said left and right rear tail lights, left and right front running lights, and left and right rear brake lights.

2. The control circuit of claim 1 comprising a flasher means mounted on said operating circuitry board, and a storage battery means having a terminal connected to said flasher means.

3. The control circuit of claim 2 comprising a first conductor means conducting electrical power for said left front and right front running lights and for said left rear and right rear tail lights; a first rectifier means and a first resistor means in series and electrically engaged to said first conductor means and to a first relay means; and a second rectifier means and a second resistor means in series and electrically engaged to a second relay means and to said first conductor means.

4. The control circuit of claim 3 wherein said flasher means is electrically engaged to a third relay means, to a fourth relay means, to a fifth relay means, to a sixth relay means, and to said first and said second relay means.

5. The control circuit of claim 4 wherein said fifth relay means is electrically engaged to said left turn signal light and indicator light by a second conductor; and said sixth relay means is electrically engaged to said right turn signal light and indicator light by a third conductor.

6. The control circuit of claim 5 wherein said second relay means is electrically engaged to said right rear brake light by a fourth conductor; and said first relay means is electrically engaged to said left rear brake light by a fifth conductor.

7. The control circuit of claim 6 wherein said third relay means is electrically engaged to said third relay means by a sixth conductor; and said fourth relay means is electrically engaged to said fourth relay means by a seventh conductor.

8. The control circuit of claim 7 wherein said fourth and seventh conductors are interconnected by a third rectifier means.

9. The control circuit of claim 8 wherein said fifth and sixth conductor means are interconnected by a fourth rectifier means.

10. The control circuit of claim 9 wherein said sixth conductor comprises a fifth rectifier means situated between said third relay means and said left rear tail light.

11. The control circuit of claim 10 wherein said seventh conductor comprises a sixth rectifier means situated between said fourth relay means and said right rear tail light.

12. The control circuit of claim 9 additionally comprising a light conductor extending from said right front running light to said seventh conductor between said fourth relay means and said sixth rectifier means.

13. The control circuit of claim 10 additionally comprising a ninth conductor extending from said left front running light to said sixth conductor between said third relay means and said fifth rectifier means.

14. The control circuit of claim 13 additionally comprising a tenth conductor extending from said right turn switch to said second relay means and is electrically engaged to said fourth relay means and to said sixth relay means.

15. The control circuit of claim 14 additionally comprising an eleventh conductor extending from said left turn switch to said first relay means and is electrically engaged to said third relay means and to said fifth relay means.

16. The control circuit of claim 15 additionally comprising a twelfth conductor extending from said emergency switch to said eleventh conductor and comprising a seventh rectifier means.

17. The control circuit of claim 16 additionally comprising a thirteenth conductor extending from said twelfth conductor to said tenth conductor and comprising an eighth rectifier means.

18. The control circuit of claim 17 additionally comprising a fourteenth conductor extending from said brake light switch to said first relay means and comprising a ninth rectifier means.

19. The control circuit of claim 18 additionally comprising a fifteenth conductor extending from said fourteenth conductor to said second relay means and comprising a tenth rectifier means.

20. The control circuit of claim 19 wherein said fourteenth conductor electrically engages to said first relay means between said first resistor and said first relay means, and said fifteenth conductor electrically engages to said second relay means between said second resistor and said second relay means, and fifteenth conductor electrically attaches to said fourteenth conductor between said ninth rectifier means and said brake light switch.

* * * * *